United States Patent [19]

Adachi

[11] Patent Number: 5,646,599
[45] Date of Patent: Jul. 8, 1997

[54] FAILURE WARNING SYSTEM OF ELECTRIC POWER UNIT IN VEHICLE

[75] Inventor: Katsumi Adachi, Hyogo, Japan

[73] Assignee: Mitsubishi Denki Kabushiki Kaisha, Tokyo, Japan

[21] Appl. No.: 510,869

[22] Filed: Aug. 3, 1995

[30] Foreign Application Priority Data

Mar. 9, 1995 [JP] Japan ........................... 7-049898

[51] Int. Cl.⁶ .................................................. G08B 21/00
[52] U.S. Cl. .................. 340/648; 340/641; 340/642; 340/644; 322/28; 322/37
[58] Field of Search ............................ 340/648, 641, 340/642, 644; 322/28, 37

[56] References Cited

U.S. PATENT DOCUMENTS

| | | | |
|---|---|---|---|
| 4,084,126 | 4/1978 | Clements | 322/8 |
| 4,306,184 | 12/1981 | Iwaki et al. | 322/28 |
| 4,336,487 | 6/1982 | Tanaka et al. | 322/28 |
| 4,362,982 | 12/1982 | Akita et al. | 320/64 |
| 4,379,990 | 4/1983 | Sievers et al. | 322/28 |
| 4,641,079 | 2/1987 | Kato et al. | 320/64 |
| 4,670,705 | 6/1987 | Sievers et al. | 322/28 |
| 5,521,486 | 5/1996 | Takamoto et al. | 322/28 |

OTHER PUBLICATIONS

The conventional (or prior art) made reference to in the application.

*Primary Examiner*—Jeffery Hofsass
*Assistant Examiner*—Mark S. Rushing
*Attorney, Agent, or Firm*—Sughrue, Mion, Zinn, Macpeak & Seas

[57] ABSTRACT

The duty ratio range of a duty signal DCN transmitted from a high-voltage load controller 12 to a field current controller 103 is divided into several subranges, which are assigned to zones, such as a normal voltage control zone, high-voltage control zone, and power generation stop and failure signal zone. The duty signal of a duty ratio in each zone is transmitted to the field current controller 103 for controlling the power generation mode of a generator 2. When a failure in a high-voltage circuit 16 is detected, the duty signal of a duty ratio in the power generation stop and failure signal zone causes power generation of the generator to stop and a pilot lamp 10 to go on for warning. The pilot lamp 10 is also used to warn the operator to a power generation error of the generator 2.

8 Claims, 5 Drawing Sheets

FAILURE WARNING SYSTEM OF ELECTRIC POWER UNIT IN VEHICLE

BACKGROUND OF THE INVENTION

This invention relates to a failure warning system of an electric power unit in a vehicle.

FIG. 4 is a circuit diagram of the prior art showing a conventional failure warning system of an electric power unit in a vehicle. FIG. 5 is a control characteristic chart showing the relationship between the duty ratio of duty signal and control voltage of a generator.

In FIG. 4, an electric power generation unit (ACT) 1 comprises a generator 2 having a stator winding 2a and a field winding 2b, a field current controller 3, and a rectifier 4 for rectifying alternating voltage occurring at the stator winding 2a to DC voltage. A noise prevention capacitor 5 for preventing noise to a radio, etc., is connected to an output terminal A of the rectifier 4.

The field current controller 3 is configured as follows: A transistor 3a has an emitter grounded via a ground line E and a collector connected via a connection line F1 to the field winding 2b for intermittently controlling a field current flowing into the field winding 2b. A free-wheel diode 3b is connected to the field winding 2b in parallel via connection lines F1 and F2 for suppressing surge voltage caused by intermittent field current by the transistor 3a.

A voltage detector 3c detects an output voltage of the rectifier 4 and the detection result is input to a voltage controller 3d. A 1-phase voltage of the generator output winding 2a is input via a connection line P1 to the voltage controller 3d for detecting a voltage of power generated by the generator.

A duty signal DC is input to a duty detector 3e via a terminal C and a connection line C1 from a high-voltage load controller 11 (described below). The duty detector 3e detects the duty signal and outputs a power voltage indication signal to the voltage controller 3d.

A diagnosis section 3f diagnoses integrity of the generator 2, for example, checks to see if an error such as no electric power generation or overvoltage exists. The field current controller 3 also includes a power supply 3g, a power drive 3h, a power on/off transistor 3j, and a transistor 3k brought into conduction when the diagnosis result of the diagnosis section 3f is abnormal for turning on an alarm lamp 10 (described below) via a terminal L. Operation power of the field current controller 3 is supplied from a battery 7 (described below) via an S terminal and a connection line S1.

A change-over switch 6 has a common contact 6c, a normally open contact 6a, a normally closed contact 6b, and an excitation coil 6d. The common contact 6c is connected to an output terminal A of the rectifier 4 via a terminal A and a connection line A1. The normally open contact 6a is connected to an electrically heated catalyst carrier 14 (described below) by a connection line H1 via a terminal H. The normally closed contact 6b is connected to the positive electrode of the battery 7 (described below) via a connection line B1.

The excitation coil 6d is connected between terminals B and D and the terminal D is connected to the high-voltage load controller 11 (described below) via a connection line D1.

A storage battery 7 and a general load 8 of headlights, etc., are connected to the output terminal A of the rectifier 4 via the terminal B of the change-over switch 6, the normally closed contact 6b, and the connection line A1. Vehicle system voltage, normal voltage (in this example, 12 V), is supplied from the generator 2.

A key switch 9 is connected in series with a pilot lamp 10 and is connected to the positive electrode of the battery 7 and a terminal L of the electric power generation unit 1 via a connection line Ig1.

The high-voltage load controller 11 receives information such as the number of revolutions of an engine via a connection line EN1 from an engine controller 12 and instructs the engine controller 12 to turn the engine over a connection line EN2. It also detects the on state of the key switch 9 over a connection line Ig2.

Also, the high-voltage load controller 11 is connected to the terminal D of the change-over switch 6 via the connection line D1 for controlling the excitation coil 6d of the change-over switch 6. Further, it detects terminal voltage of a heater 14a of the electrically heated catalyst carrier (EHC) 14 (described below) via a terminal H and a connection line H2. It also detects temperature of the heater 14a of the EHC 14 by a temperature sensor 14b via a terminal T and a connection line T1. An indicator lamp 13 is connected to a terminal W.

The high-voltage load controller 11 transmits duty signal DC, which is a control signal of periodic pulse, to the field current controller 3 via the terminal C and the connection line C1. The generator 2 is controlled in response to the duty ratio DU of the duty signal DC (this topic will be discussed in detail below):

0≦DU<15 [%] normal voltage control zone
15≦DU<30 [%] power generation stop zone
30≦DU<100 [%] high-voltage control zone where the duty ratio DU of the duty signal DC is represented as percentage of the pulse width to the pulse period.

The electrically heated catalyst carrier (EHC) 14 has the metallic heater 14a, which also serves as a catalyst carrier, connected between the Normally open contact 6a of the change-over switch 6 and ground via the connection line H1, and high voltage (in this example, about 30 V) is applied. The EHC 14 is provided with the temperature sensor 14b for detecting an arrival point in time to active temperature of a catalyst of the heater 14a (about 400° C.), overheat thereof, etc.

A normal voltage circuit 15 is a circuit containing the battery 7 and the general load 8; normal voltage is applied. A high-voltage circuit 16 is a circuit containing the EHC 14; high voltage is applied.

In the electric power generation unit 1 thus configured, vehicle system voltage of about 12–14 V, normal voltage, is applied to the battery 7, the general load 8, the connection lines D1, B1, S1, IG1, etc. High voltage of about 30–40 V is applied to the heater 14a and connection line H1 of the EHC 14, the contact 6a of the change-over switch 6, etc.

When the generator 2 runs at a normal voltage, normal voltage is applied to the stator winding 2a and field winding 2b of the generator 2, the rectifier 4, the noise prevention capacitor 5, the common contact 6c of the change-over switch 6, the connection lines A1, P1, F1, and F2, the terminal A, etc.; whereas when the generator 2 runs at a high voltage, high voltage is applied thereto.

In operation, first when the ignition switch 9 is turned on and further a starter switch (not shown) is turned on, the engine (not shown) starts turning and at the same time, the generator 2 also starts turning. At the time, the normally closed contact 6b of the change-over switch 6 is connected to the common contact 6c for supplying an initial excitation current from the battery 7 to the field winding 2b of the generator 2.

At the time, duty signal DC, for example, of duty ratio 10% is sent from the high-voltage load controller 11 to the field current controller 3 and the generator 2 starts power generation at the vehicle system voltage 12.8 V, normal voltage. Immediately after it, duty signal DC of duty ratio in the power generation stop zone, for example, duty ratio 20% is sent from the terminal C of the high-voltage load controller 11, causing the generator 2 to change to the power generation stop (no charge) mode.

Further, the excitation coil 6d of the change-over switch 6 is excited via the terminal D by the high-voltage load controller 11 with a given time delay (about one second) and the normally open contact 6a and the common contact 6c are connected for switching the output terminal A of the generator 2 to the EHC 14. After this, with a given time delay (about one second), the high-voltage load controller 11 sends duty signal DC, for example, of duty ratio 75% in a preset high voltage control zone to the field current controller 3 through the terminal C, thereby changing the generator 2 from the no charge mode to the high-voltage power generation mode for controlling the generator voltage to about 30 V in response to the duty ratio 75% through the duty detector 3e and the voltage controller 3d.

The temperature sensor 14b of the EHC 14 detects the timing at which the heater 14a reaches the active temperature of the catalyst and power supply becomes unnecessary. When the power supply to the EHC 14 becomes unnecessary, the high-voltage load controller 11 transmits duty signal DC, for example, of duty ratio 20% for placing the generator 2 in the no charge mode to decrease the output current to the EHC 14 or bring it to almost zero in order to prolong the contact life of the change-over switch 6 and prevent semiconductor devices from being destroyed due to surge voltage generated by load cutoff of the generator 2.

Then, the common contact 6c of the change-over switch 6 is switched to the normally closed contact 6b for connecting the output terminal A of the electric power generation unit 1 to the normal voltage circuit 15 containing the battery 7.

Further, with a given time delay (about one second), the high-voltage load controller 11 sends duty signal DC, for example, of duty ratio 0% to the field current controller 3 for placing the generator 2 in the normal voltage power generation mode to generate power at 14.4 V.

The high-voltage load controller 11 is provided with the terminal H to detect voltage applied to the EHC 14 and a terminal T for the temperature sensor to detect temperature of the heater 14a for detecting an abnormal condition in the high-voltage circuit 16, such as a broken line, short circuit, or overheat of the heater 14a of the EHC 14, over the connection lines H2 and T1. When detecting an abnormal condition, the high-voltage load controller 11 turns on or blinks the indicator lamp 13 connected to the terminal W of the high-voltage load controller 11 for giving a warning of the abnormal condition to the vehicle driver, etc. Further, it uses the diagnosis section 3f for detecting an abnormal condition of power generation of the generator 2, such as no power generation or high voltage of the generator 2 detected over the connection line P1, and turns on or blinks the pilot lamp 10 connected to the terminal L of the field current controller 3 of the electric power generation unit 1 for giving a warning of the abnormal condition to the vehicle driver, etc.

The high-voltage load controller 11 may change the duty ratio of the duty signal DC for controlling the voltage of the generator 2 in response to the duty ratio. For example, it changes the duty ratio of the duty signal DC in the range of 0% to 15% for controlling the normal voltage supplied to the normal voltage circuit 15 in response to the duty ratio. In FIG. 4, it may instruct the field current controller 3 to control the voltage to 14.4 V in the range of 0%–5% and 12.8 V in the range of 5%–15%. Likewise, it can also transmit duty signal DC of duty ratio 30%–100% for controlling the voltage supplied to the high-voltage circuit to 12.8–40 V in response to the duty ratio.

Since the conventional warning system of an electric power unit in a vehicle is thus configured, two lamps of the pilot lamp 10 and the indicator lamp 13 must be provided for failure alarms of the power unit and wiring is required for each of the lamps, leading to high costs and an increase in the installation space.

SUMMARY OF THE INVENTION

It is therefore an object of the invention to provide a failure warning system of an electric power unit in a vehicle which can warn the driver of a failure by one failure warning means and lessen the installation space of the warning means at low costs.

The present invention accordingly provides a failure warning system of an electric power unit in a vehicle, comprising: field current control means for controlling a field current of a generator; a switching means for switching a supply of a generator output between a normal voltage circuit including a battery and a high-voltage circuit including a high-voltage load which requires a higher voltage than the normal voltage; high-voltage load control means for outputting a switch control signal to operate the switching means, and a control signal which is a periodical pulse signal transmitted to the field current control means to place the generator in a normal voltage mode or a high voltage mode via the field current control means in response to a duty ratio of the control signal, said control signal including the detection result at a predetermined duty ratio upon detection of a failure in the high-voltage circuit; generation error detection means being disposed in the field current control means for detecting a power generation error in the generator; reception means being disposed in the field current control means for receiving the failure detection result in the high-voltage circuit based on the duty ratio of the control signal, and failure warning means for warning an operator of the detection result for the generation error detection means and the high-voltage circuit failure detection result received by the reception means.

In the failure warning system of the electric power unit, the power generation mode of the generator is switched between the normal voltage power generation mode and high-voltage power generation mode by changing the duty ratio of the control signal. When a failure in the high-voltage circuit is detected, the detection result is transmitted to the reception means located in the field current control means as the control signal of a predetermined duty ratio. That is, the power generation mode of the generator is switched and the failure detection result in the high-voltage circuit is transmitted to the reception means located in the field current control means in response to the duty ratio of the control signal. Thus separate transmission of the failure detection result in the high-voltage circuit is not required, facilitating transmission. The reception means receives the detection result and the failure warning means warns the operator to the high-voltage circuit failure. Therefore, the failure warning means can warn the operator to both a power generation error of the generator and a high-voltage circuit failure, eliminating the need for providing warning means dedicated to the high-voltage circuit.

Further, in the failure warning system of the electric power unit, a first predetermined duty ratio range of the control signal is assigned to a first control zone for placing the generator in the normal voltage power generation mode by the control signal of a duty ratio in the first control zone, a second predetermined duty ratio range of the control signal different from the first duty ratio range is assigned to a second control zone for placing the generator in the high-voltage power generation mode by the control signal of a duty ratio in the second control zone, and power generation of the generator is stopped by the control signal of a duty ratio not overlapping the first or second control zone.

Accordingly, the power generation mode of the generator is controlled by the control signal of a duty ratio in the first and second control zones and power generation of the generator is stopped by the control signal of a duty ratio not overlapping the first or second control zone (different from the first and second control zone). In response to the requirement, the control signal of a predetermined duty ratio can be transmitted to the field current control means to stop the power generation of the generator. Therefore, flexibility of controlling the generator is enhanced.

Furthermore, in the failure warning system of an electric power unit, the duty ratio of the control signal is varied in the first or second control zone so that the power generation voltage of the generator is controlled to a predetermined normal voltage or high voltage through the field current control means in response to the duty ratio of the control signal. Therefore, the voltage of the generator can be controlled as desired in accordance with the duty ratio of the control signal.

Moreover, in the failure warning system of an electric power unit, power generation of the generator is stopped and the high-voltage circuit failure detection result is transmitted by the control signal of a duty ratio not overlapping the first or second control zone. Accordingly, the operator is warned to a high-voltage circuit failure and power generation of the generator is stopped by the control signal of a duty ratio not overlapping the first or second control zone. That is, both warning the operator to the high-voltage circuit failure and stopping the power generation can be carried out.

Still further, in the failure warning system of an electric power unit, power generation of the generator is stopped by the control signal of a duty ratio between the first and second control zones, and power generation of the generator is stopped and the high-voltage circuit failure detection result is transmitted by the control signal of a duty ratio smaller or larger than the first and second control zones.

In the warning system as mentioned above, since power generation is stopped by the control signal of a duty ratio between the first and second control zones, when the duty ratio of the control signal is continuously changed for switching the generator to the high-voltage or normal voltage power generation mode, the generator once stops power generation meanwhile. The failure detection result in the high-voltage circuit is transmitted by the control signal of a duty ratio smaller or greater than the first and second control zones, thus need not be transmitted by the control signal of a duty ratio between the first and second control zones. Therefore, when the duty ratio of the control signal is continuously changed for switching the power generation mode of the generator from high voltage to low voltage, the generator once stops power generation meanwhile. To operate the switch means when the generator stops power generation, control is facilitated and warning the operator to a failure can be suppressed meanwhile.

Still furthermore, in the failure warning system of a electric power unit, the generator is placed in a power generation mode near the normal voltage and a duty ratio error is transmitted by at least either of the control signal of duty ratio 0% and that of duty ratio 100%, the duty ratio error is received by the reception means based on the duty ratio of the control signal, and the operator is warned to the duty ratio error by the failure warning means.

In the failure warning system, when the control signal transmission circuit becomes open or short-circuited, the duty ratio of the control signal becomes 0% or 100% and an error occurs. However, since the control signal of the duty ratio 0% or 100% causes the generator to enter the power generation mode near the normal voltage, even if the duty ratio of the control signal becomes abnormal, the system is not placed out of control and has a fail-safe function. Since the abnormal duty ratio of the control signal is transmitted by the control signal, the operator can also be warned to the duty ratio error.

DETAILED DESCRIPTION OF PREFERRED EMBODIMENTS

Figure 1:
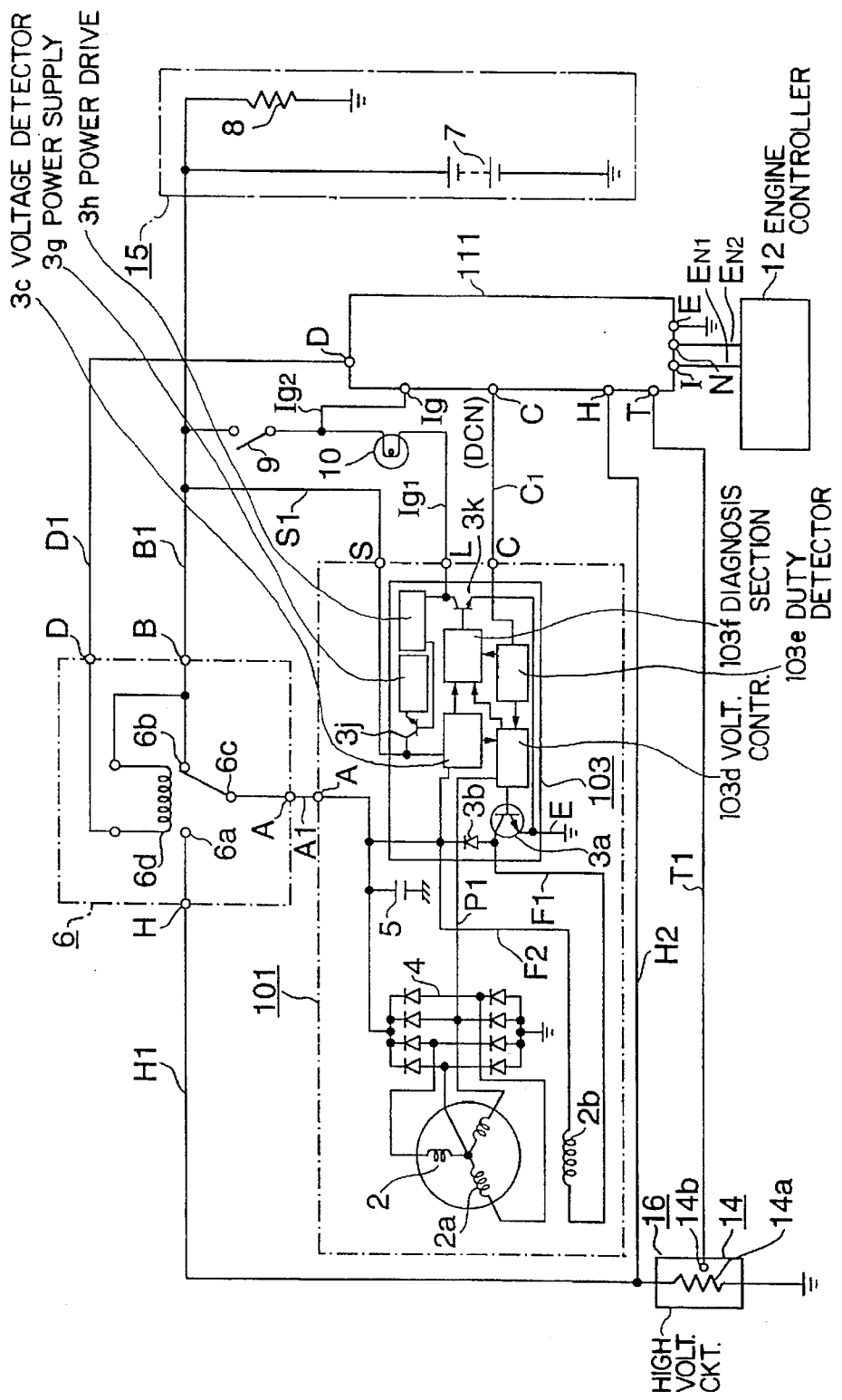
FIG. 1 is a circuit diagram showing a failure warning system of an electric power unit according to a first embodiment of the invention.
Figure 2:
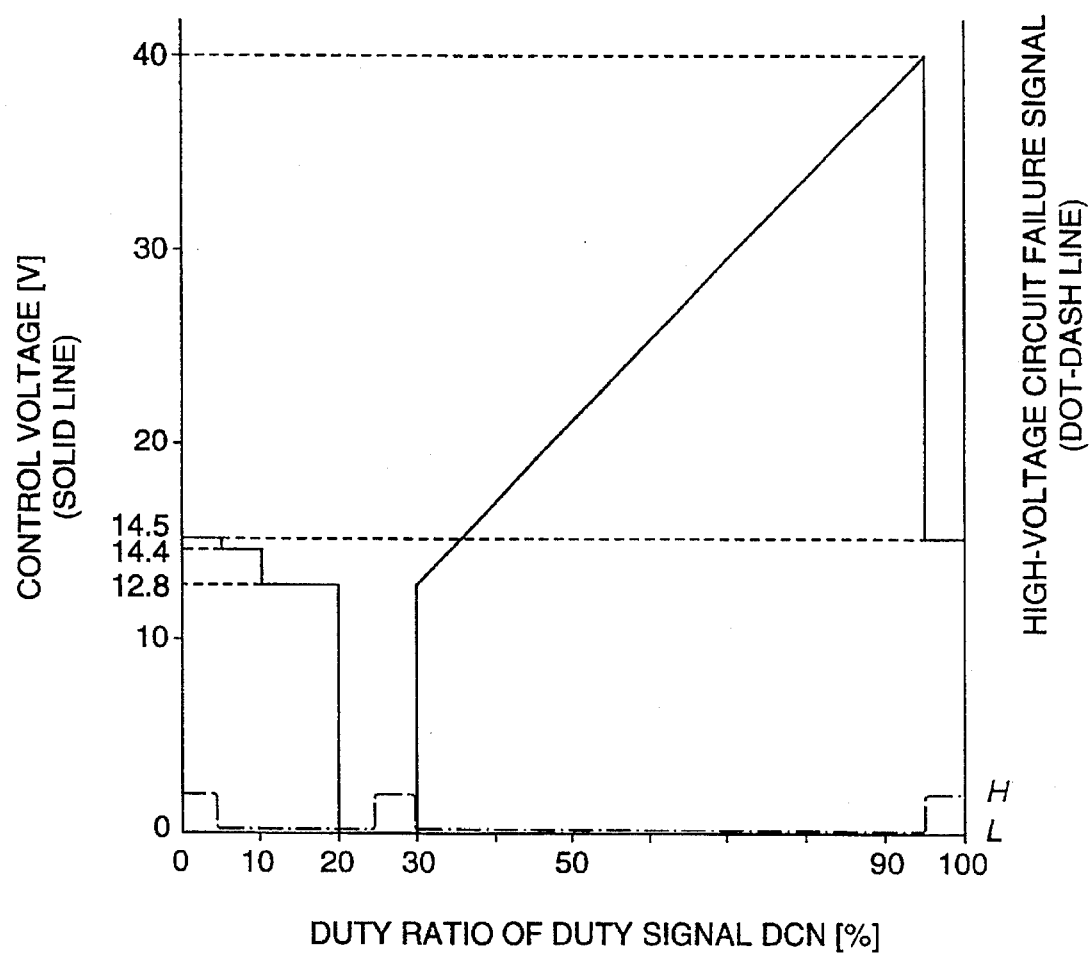
FIG. 2 is a control characteristic chart showing the relationship between the duty ratio of duty signal and control voltage of a generator in the first embodiment in FIG. 1.
Figure 4:
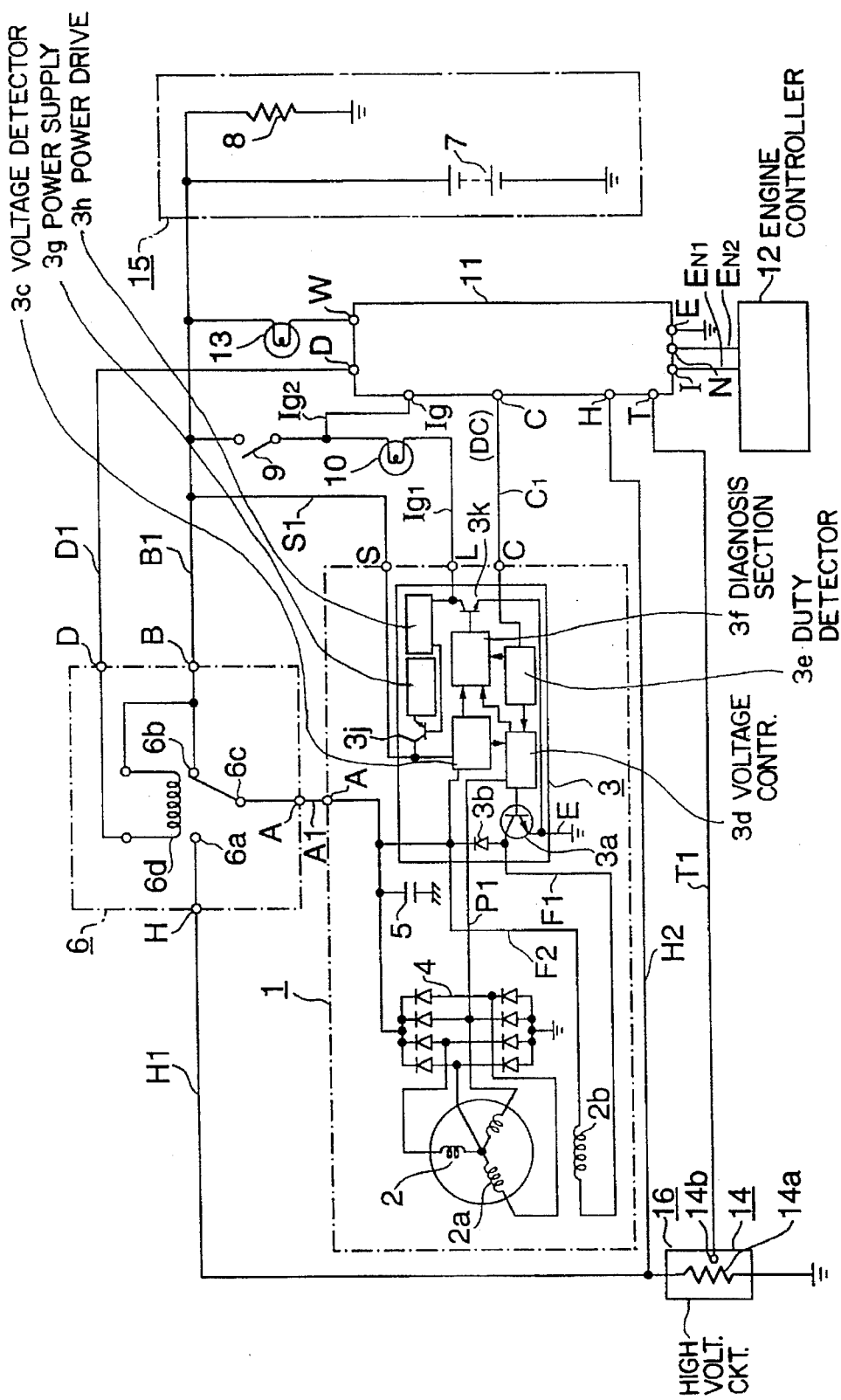
FIG. 4 is a circuit diagram showing a conventional failure warning system of an electric power unit.
Figure 5:
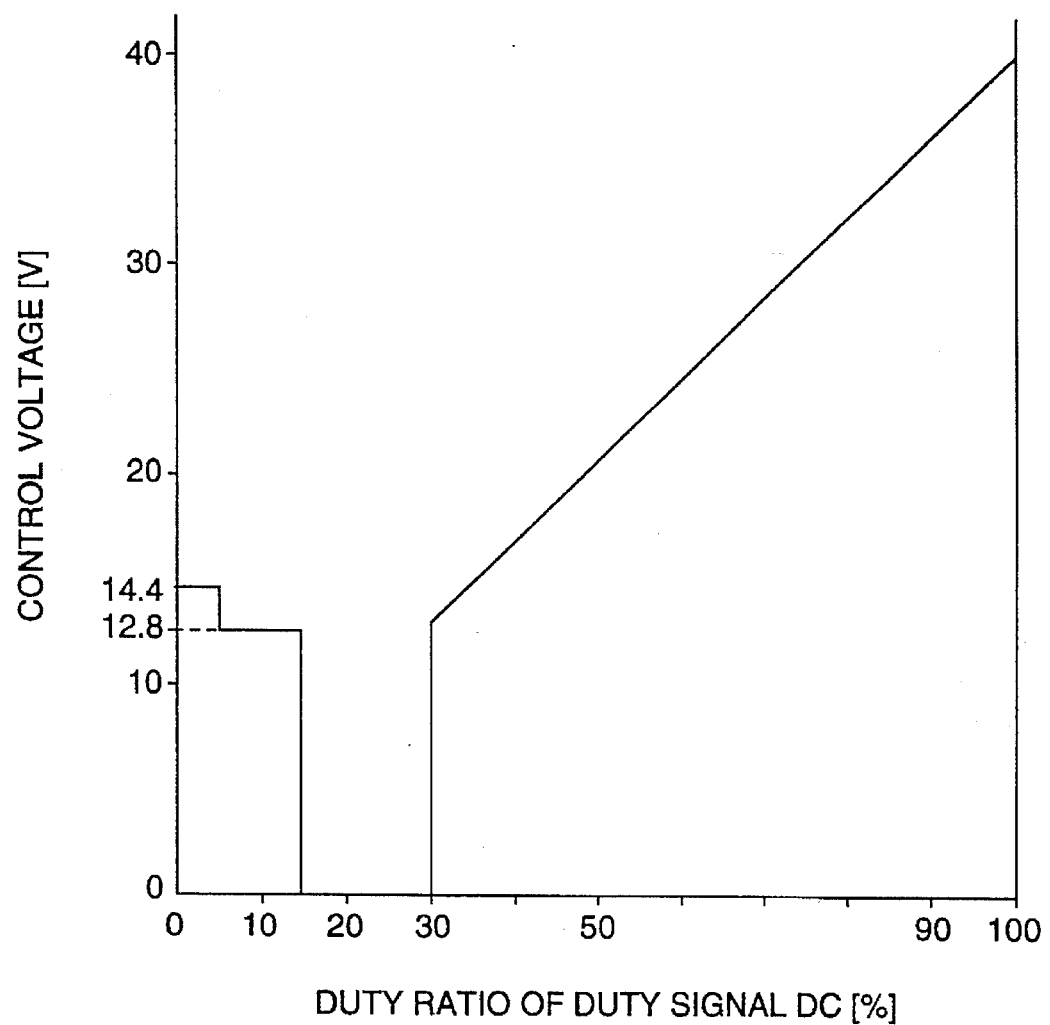
FIG. 5 is a control characteristic chart showing the relationship between the duty ratio of duty signal and control voltage of a generator in the conventional system in FIG. 4.

Referring now to the accompanying drawings, there are shown preferred embodiments of the invention.
Embodiment 1:

A first embodiment of the invention will be discussed. FIG. 1 is a circuit diagram showing a failure warning system of an electric power unit according to the first embodiment of the invention. FIG. 2 is a control characteristic chart showing the relationship between the duty ratio of duty signal and control voltage of a generator. In FIG. 1, the indicator lamp 13 connected to the high-voltage load controller 11, the W terminal of the controller 11, and wiring for the indicator lamp 13 in the conventional system in FIG. 4 are removed; only a pilot lamp 10 connected to a field current controller is provided for failure warning.

In FIG. 1, an electric power generation unit (ACT) 101 comprises a generator 2 having a stator winding 2a and a field winding 2b, a field current controller 103, which is field current control means, and a rectifier 4 for rectifying alternating voltage occurring at the stator winding 2a to DC voltage. A noise prevention capacitor 5 for preventing noise to a radio, etc., is connected to an output terminal A of the rectifier 4.

The field current controller 103, field current control means, is configured as follows: A transistor 3a has an emitter grounded via a ground line E and a collector connected via a connection line F1 to the field winding 2b for intermittently controlling a field current flowing into the field winding 2b. A free-wheel diode 3b is connected to the field winding 2b in parallel via connection lines F1 and F2 for suppressing surge voltage caused by intermittent field current by the transistor 3a.

A voltage detector 3c detects an output voltage of the rectifier 4 and the detection result is input to a voltage controller 103d. A 1-phase voltage of the generator output winding 2a is input via a connection line P1 to the voltage controller 103d for detecting a voltage of power generated by the generator.

A duty signal DCN is input to a duty detector 103e, which is reception means, via a terminal C and a connection line C1 from a high-voltage load controller 111 (described below). The duty detector 103e detects the duty signal and outputs a power voltage indication signal to the voltage controller 103d.

A diagnosis section 103f, which is generation error detection means, diagnoses integrity of the generator 2, for example, checks to see if an error such as no electric power generation or overvoltage exists. The field current controller 103 also includes a power supply 3g, a power drive 3h, a power on/off transistor 3j, and a transistor 3k brought into conduction when the diagnosis result of the diagnosis section 103f is abnormal for turning on an alarm lamp 10 (described below) via a terminal L. Operation power of the field current controller 103 is supplied from a battery 7 (described below) via an S terminal and a connection line S1.

A change-over switch 6, which is switch means, has a common contact 6c, a normally open contact 6a, a normally closed contact 6b, and an excitation coil 6d. The common contact 6c is connected to an output terminal A of the rectifier 4 via a terminal A and a connection line A1. The normally open contact 6a is connected to an electrically heated catalyst carrier 14 (described below) by a connection line H1 via a terminal H. The normally closed contact 6b is connected to the positive electrode of the battery 7 via a connection line B1.

The excitation coil 6d is connected between terminals B and D and the terminal D is connected to the high-voltage load controller 111 (described below) via a connection line D1.

A storage battery 7 and a general load 8 of headlights, etc., are connected to the output terminal A of the rectifier 4 via the terminal B of the change-over switch 6, the normally closed contact 6b, and the connection line A1. Vehicle system voltage, normal voltage (in this example, 12 V), is supplied from the generator 2.

A key switch 9 is connected in series with a pilot lamp 10, which is failure warning means, and is connected to the positive electrode of the battery 7 and a terminal L of the electric power generation unit 101 via a connection line Ig1.

The high-voltage load controller 111 receives information such as the number of revolutions of an engine via connection lines EN1 and EN2 from an engine controller 12 and also detects the on state of the key switch 9 over a connection line Ig2.

Also, the high-voltage load controller 111 is connected to the terminal D of the change-over switch 6 via the connection line D1 for controlling the excitation coil 6d of the change-over switch 6. Further, it detects terminal voltage of a heater 14a of the electrically heated catalyst carrier (EHC) 14 via a terminal H and a connection line H2. It also detects temperature of the heater 14a of the EHC 14 by a temperature sensor 14b via a terminal T and a connection line T1.

The high-voltage load controller 111 transmits duty signal DCN, which is a control signal of periodic pulse, to the field current controller 103 via the terminal C and the connection line C1.

The EHC 14 has the metallic heater 14a, which also serves as a catalyst carrier, connected between the normally open contact 6a of the change-over switch 6 and ground via the connection line H1, and high voltage (in this example, about 30 V) is applied. The EHC 14 is provided with the temperature sensor 14b for detecting an arrival point in time to active temperature of a catalyst of the heater 14a (about 400° C.), overheat thereof, etc.

A normal voltage circuit 15 is a circuit containing the battery 7 and the general load 8; normal voltage is applied. A high-voltage circuit 16 is a circuit containing the EHC 14; high voltage is applied.

In the system thus configured, vehicle system voltage of about 12–14 V, normal voltage, is applied to the battery 7, the general load 8, the connection lines D1, B1, S1, IG1, etc. High voltage of about 30–40 V is applied to the heater 14a and connection line H1 of the EHC 14, the contact 6a of the change-over switch 6, etc.

When the generator 2 generates power at a normal voltage, normal voltage is applied to the stator winding 2a and field winding 2b of the generator 2, the rectifier 4, the noise prevention capacitor 5, the common contact 6c of the change-over switch 6, the connection lines A1, P1, F1, and F2, the terminal A, etc.; when the generator 2 generates power at a high voltage, high voltage is applied thereto.

In the high-voltage load controller 111, high-voltage load control means, the contents of the duty signal DCN as a control signal transmitted to the field current controller 103 as field current control means vary.

The duty ratio DU of the duty signal DCN of a control signal transmitted by the high-voltage load controller 111, high-voltage load control means, to the field current controller 103, field current control means, is assigned as follows: (See also FIG. 2.)

| | |
|---|---|
| 0 ≦ DU < 5 [%] | voltage control at abnormal duty ratio and abnormal duty ratio signal zone; |
| 5 ≦ DU < 20 [%] | normal voltage control zone; |
| 20 ≦ DU < 25 [%] | power generation stop zone; |
| 25 ≦ DU < 30 [%] | power generation stop and failure signal zone; |
| 30 ≦ DU < 95 [%] | high voltage control zone; |
| 95 ≦ DU ≦ 100 [%] | voltage control at abnormal duty ratio and abnormal duty ratio signal zone. |

That is, the range of duty ratio of duty signal DCN 5≦DU<20 [%] is assigned to the normal voltage control zone, the first control zone; the generator 2 is placed in the normal voltage power generation mode and the voltage supplied to the normal voltage circuit 15 is controlled in response to the duty ratio. The range of 30≦DU<95 [%] is assigned to the high voltage control zone, the second control zone; the generator 2 is placed in the high voltage power generation mode and the voltage supplied to the high voltage circuit 16 is controlled in response to the duty ratio.

Further, the range of 20≦DU<25 [%] is assigned to the power generation stop zone in which the generator 2 is placed in the no charge mode for stopping the power generation of the generator 2. The range of 25≦DU<30 [%] overlapping the power generation stop zone is set to the power generation stop and failure signal zone in which upon detection of a failure of the high-voltage circuit 16, the high-voltage load controller 111 transmits the detection result and stops the power generation of the generator 2.

The range of 0≦DU<5 [%] or 95≦DU≦100 [%] is assigned to the voltage control at abnormal duty ratio and abnormal duty ratio signal zone in which the voltage is controlled to 14.5 V as a voltage close to the normal voltage.

The operation will be discussed with reference to FIG. 2.

First, when the ignition switch 9 is turned on and further a starter switch (not shown) is turned on, the engine (not shown) starts turning and at the same time, the generator 2 also starts turning. At the time, the normally closed contact 6b of the change-over switch 6 is connected to the common contact 6c for supplying an initial excitation current from the battery 7 to the field winding 2b of the generator 2.

On the other hand, duty signal DCN of any duty ratio in the normal voltage control zone, for example, duty ratio 15%, is sent from the high-voltage load controller 111 to the field current controller 103 and the generator 2 starts power generation at the vehicle system voltage 12.8 V, normal voltage. Immediately after the generator 2 starts power generation, the duty signal DCN of the duty ratio in the power generation stop zone, for example, duty ratio 22%, is sent from the terminal C of the high-voltage load controller 111 to the field current controller 103. The field current controller 111 then reduces the field current of the generator 2 to zero based on the signal, in this example for changing the generator 2 to the no charge mode.

Further, when the voltage of the generator 2 lowers near to zero in a given time (about one second), the excitation coil 6d of the change-over switch 6 is excited via the terminal D by the high-voltage load controller 111 and the normally open contact 6a and the common contact 6c are connected for switching the output terminal A of the generator 2 to the EHC 14. Excitation of the excitation coil 6d by the high-voltage load controller 111 corresponds to a switch control signal to the switch means in the invention.

After this, with a given time delay (about one second), the high-voltage load controller 111 sends duty signal DCN of any duty ratio in the preset high voltage control zone, for example, duty ratio 70%, to the field current controller 103 through the terminal C, thereby changing the generator 2 from the no charge mode to the high-voltage power generation mode for controlling the generator voltage to, in this example about 30 V corresponding to the duty ratio 70% through the duty detector 103e and the voltage controller 103d.

Concurrently, the temperature sensor 14b of the EHC 14 detects the timing at which the heater 14a reaches the active temperature of the catalyst and power supply becomes unnecessary. When the power supply to the EHC 14 becomes unnecessary, the high-voltage load controller 111 transmits control signal, for example, of duty ratio 22%, in the power generation stop zone for placing the generator 2 in the power generation stop (no charge) mode to bring the output current to the EHC 14 to almost zero in order to prolong the contact life of the change-over switch 6 and prevent semiconductor devices from being destroyed due to surge voltage generated by load cutoff of the generator 2.

Then, the common contact 6c of the change-over switch 6 is switched to the normally closed contact 6a for connecting the output terminal A of the electric power generation unit 101 to the normal voltage circuit 15 containing the battery 7.

Further, in a given time (about one second), the high-voltage load controller 111 sends duty signal DCN of any duty ratio in the normal voltage control zone, for example, duty ratio 8% or 15%, to the field current controller 103 for placing the generator 2 in the normal voltage power generation mode, in this example to control the voltage to 14.4 or 12.8 V.

When detecting a failure of the high-voltage circuit 16, such as a broken line or short circuit of the heater 14b of the EHC 14, the high-voltage load controller 111 transmits duty signal DCN of any duty ratio in the range of 25%≦DU<30% in the power generation stop and failure signal zone, for example, duty ratio 27%, to the duty detector 103e, which then handles the duty signal as a failure signal and sends a warning signal to the diagnosis section 103f. Upon reception of the warning signal, the diagnosis section 103f brings the transistor 3k into conduction for turning on the pilot lamp 10 to display the failure of the high-voltage circuit 16.

Like the diagnosis section 3f in the conventional system, the diagnosis section 103f detects a power generation error of the generator 2, such as no power generation or abnormal voltage of the generator 2, and causes the pilot lamp 10 to go on. The pilot lamp 10 is driven and turned on by an OR circuit of the alarm signal of the high-voltage circuit 16 and the failure signal of the normal voltage circuit 15.

If the terminal C of the high-voltage load controller 111 is grounded or the connection line C1 is broken, the system is placed out of control. As countermeasures, the ranges of 95%≦DU≦100% and 0%≦DU<5% in the embodiment (the duty ratio of the duty signal DCN at the time, DU 100% and near and 0% and near) are assigned each to the voltage control at abnormal duty ratio and abnormal duty ratio signal zone. The power generation voltage of the generator 2 is controlled to 14.5 V slightly higher than the normal voltage. The duty detector 103e receives the control signal of duty ratio 100% as an abnormal duty ratio signal indicating that the duty ratio of the control signal is abnormal.

When the duty detector 103e receives the control signal DCN as an abnormal duty ratio signal, the pilot lamp 10 is turned on. For example, when the terminal C of the high-voltage load controller 111 is grounded, the duty ratio becomes 100%. Thus, the control signal of duty ratio 100% causes the voltage of the generator 2 to be controlled to 14.5 V, a failure control voltage near the normal voltage. In addition, the pilot lamp 10 is turned on, warning the vehicle driver, etc., that the duty ratio of the duty signal is abnormal.

When the connection line C1 is broken, the duty ratio of the control signal becomes zero. Likewise, the control signal of duty ratio 0% causes the voltage of the generator 2 to be controlled to 14.5 V and the pilot lamp 10 to go on for warning.

Figure 3:
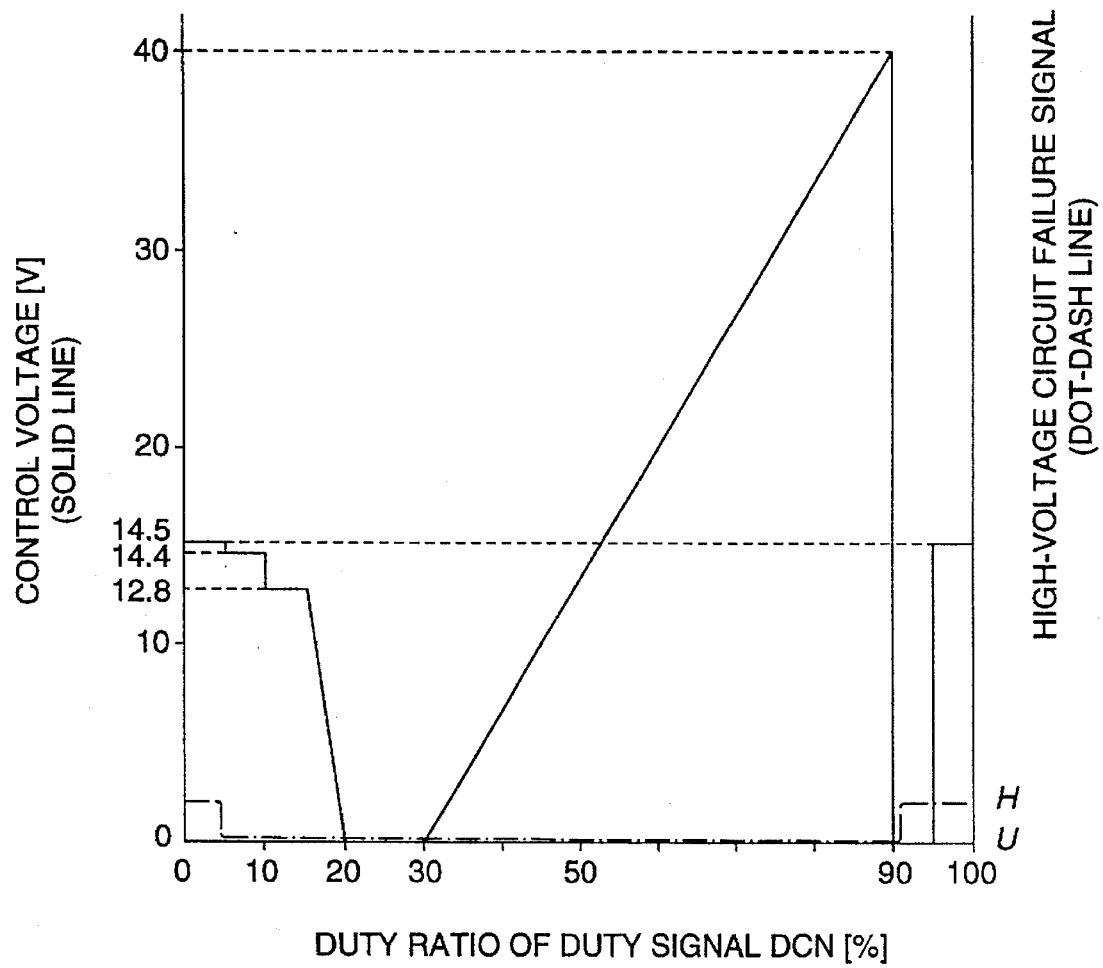
FIG. 3 is a control characteristic chart showing the relationship between the duty ratio of duty signal and control voltage of a generator in a second embodiment of the invention.

Embodiment 2:

A second embodiment of the invention will be discussed. FIG. 3 is a control characteristic chart showing the relationship between the duty ratio of duty signal and control voltage of a generator in the second embodiment of the invention. In the embodiment, the duty ratio DU of the duty signal of a control signal transmitted by the high-voltage load controller 111, high-voltage load control means, to the field current controller 103, field current control means, is assigned as follows:

| | |
|---|---|
| 0 ≦ DU < 5 [%] | voltage control at abnormal duty ratio and abnormal duty ratio signal zone; |
| 5 ≦ DU < 20 [%] | normal voltage control zone; |
| 20 ≦ DU < 30 [%] | first power generation stop zone; |
| 30 ≦ DU < 90 [%] | high voltage control zone; |

-continued

| | |
|---|---|
| 90 ≦ DU < 95 [%] | second power generation stop and failure signal zone; |
| 95 ≦ DU ≦ 100 [%] | voltage control at abnormal duty ratio and abnormal duty ratio signal zone. |

Thus, the duty ratio DU of the duty signal DCN is assigned to various signal zones and the voltage of a generator 2 is controlled in response to the duty ratio DU as shown in FIG. 3.

That is, in the normal voltage control zone, the power generation voltage of the generator 2 is increased from 0 V to 12.8 V in response to duty ratio decrease from 20% to 15%, and in the high-voltage control zone, the power generation voltage of the generator 2 is increased from 0 V to 40 V in response to duty ratio increase from 30% to 90%.

When a failure of a high-voltage circuit 16 is detected, the duty signal DCN of any desired duty ratio in the second power generation stop and failure signal zone, for example, duty ratio 93% is transmitted to the field current controller 103 for causing a pilot lamp 10 to go on for warning.

The ranges of 0≦DU<5 [%] and 95≦DU≦100 [%] are assigned each to the voltage control at abnormal duty ratio and abnormal duty ratio signal zone in which the voltage is controlled to 14.5 V as a voltage near the normal voltage.

Thus, to switch an output of the generator 2 from the high-voltage circuit 16 to a normal voltage circuit 15, as the duty ratio is lowered from 70% gradually, the voltage of the generator is also lowered gradually. When the duty ratio reaches 30%, power generation stops. After power generation stops, the output of the generator 2 is switched to the normal voltage circuit 15 from the high-voltage circuit 16 by a change-over switch 6 in an almost no voltage condition. Further, when the duty ratio lowers to 20%, the voltage of the generator starts to rise. When the duty ratio reaches 15%, the voltage is controlled to predetermined voltage 12.8 V.

The duty ratio of a failure signal of the high-voltage circuit 16 is assigned to the second power generation stop zone, so that output of the failure signal is suppressed when the first power generation stop zone of duty ratio 20≦DU<30 [%] is passed through. Also, the voltage is continuously changed, preventing load of the generator from rapidly changing for absorbing a shock to an engine.

In contrast, to switch an output of the generator 2 from the normal voltage circuit 15 to the high-voltage circuit 16, similar operation is also performed. For example, the duty ratio is increased from 15% gradually and after the first power generation stop zone is passed through, power generation is stopped. Meanwhile, the output of the generator 2 is switched from the normal voltage circuit 15 to the high-voltage circuit 16 by the change-over switch 6.

When the engine is started, a similar concept is also applied. For example, as the duty ratio of the control signal DCN is lowered starting at the first power generation stop zone of duty ratio 25%, initial excitation of the generator is executed for preventing rapid voltage rising. When the voltage rises to a certain degree (need not rise to 12.8 V), then the duty ratio is increased and again the first power generation stop zone of 20%–30% is passed through for stopping the power generation of the generator. Meanwhile, the change-over switch 6 is switched. After this, the duty ratio is increased to 70% for setting the voltage of the generator to about 30 V.

As described above, one conventional pilot lamp usually used is used as the failure warning means for warning the operator to a failure of both the normal voltage and high-voltage circuits. Of course, the failure warning means may be made of a buzzer or liquid crystal character display or both of them.

In the first or second embodiment, each of the normal voltage control zone, power generation stop zone, high-voltage control zone, power generation stop and failure signal zone, and voltage control at abnormal duty ratio and abnormal duty ratio signal zone of the duty signal has a wide duty ratio range. However, the range need not necessarily be widened and may be selected in accordance with control; the range may be extremely narrow or a substantial point depending on the control contents.

For example, as described in the first embodiment, to use the duty signal of duty ratio 0% or 100% for giving a warning of abnormal duty ratio, the voltage control at abnormal duty ratio and abnormal duty ratio signal zone is substantially a point of duty ratio 0% or 100%. Generally, each zone is assigned a reasonable range considering drift, etc., of the control signal.

Further, the duty signal of duty ratio 0% and that of 100% are used to give a warning of abnormal duty ratio and the voltage of the generator is set to 14.5 V in the first and second embodiments, but only one of them may be used.

In the embodiments, when power generation of the generator is abnormal, the pilot lamp 10 is continuously turned on, when the high-voltage circuit fails, the pilot lamp 10 is blinked in a short period, and when the duty ratio of the duty signal is abnormal, the pilot lamp 10 is blinked in a long period, whereby the failures can also be distinguished from each other in warning. To use a buzzer for warning the operator to failures, likewise the period of intermittent sound can be varied to distinguish the failures from each other.

In the embodiment in FIG. 1, the voltage of the generator is controlled to 14.4–12.8 V or 12.8–40 V in response to the duty ratio of the duty signal. However, for example, the duty ratio of a control signal may be changed in the range of 5≦DU<20 [%] for performing voltage control of 14.4–12.8 V as shown in FIG. 2 and a control signal of any duty ratio in the zone of 30≦DU<95 [%], for example, duty ratio 50% may be transmitted for placing the generator in the high-voltage mode under no voltage control for supplying the generated voltage (about 30–40 V) determined by the state of the generator, load, etc., at the time to high-voltage load.

When the output of the generator 2 is switched between the normal voltage circuit 15 and the high-voltage circuit 16 by the change-over switch 6, the generator 2 is at once placed in the power generation stop mode in the embodiment. However, a change-over switch capable of performing predetermined load opening/closing would eliminate the need for switching the circuits in the power generation stop mode.

Since the failure warning system of an electric power unit thus configured uses one failure warning means for warning the operator to both a failure of the high-voltage circuit and abnormal power generation of the generator, the display lamp 13 for giving a warning of high-voltage circuit failure and its related wiring become unnecessary, reducing the installation space.

What is claimed is:

1. A failure warning system of an electric power unit in a vehicle, comprising:
   field current control means for controlling a field current of a generator;
   a switching means for switching a supply of a generator output between a normal voltage circuit including a battery and a high-voltage circuit including a high-voltage load which requires a higher voltage than the normal voltage;

high-voltage load control means for outputting a switch control signal to operate the switching means, and for outputting a control signal which is a periodical pulse signal transmitted to the field current control means to place the generator in a normal voltage mode or a high voltage mode via the field current control means in response to a duty ratio of the control signal, said control signal including the detection result at a predetermined duty ratio upon detection of a failure in the high-voltage circuit;

generation error detection means being disposed in the field current control means for detecting a power generation error in the generator;

reception means being disposed in the field current control means for receiving the failure detection result in the high-voltage circuit based on the duty ratio of the control signal, and failure warning means for warning an operator of the detection result of the generation error detection means and the high-voltage circuit failure detection result received by the reception means;

wherein control over a power generation mode of the generator and control of the failure warning means are both carried out in response to said duty ratio of said control signal.

2. A failure warning system of an electric power unit as claimed in claim 1, wherein a first predetermined control signal duty ratio range is assigned to a first control zone for maintaining control of the operation of the generator in the normal voltage power generation mode regulated by the control signal a second predetermined control signal duty ratio range, different from the first control signal duty ratio range, is assigned to a second control zone for maintaining control of the operation of the generator in the high-voltage power generation mode regulated by the control signal, and power generation of the generator is stopped when the high-voltage load control means transmits a control signal of a duty ratio different from the first and second control zones.

3. A failure warning system of an electric power unit as claimed in claim 2, wherein the control signal duty ratio is varied in the first and second control zones to control the power generation voltage of the generator so as to be maintained at a predetermined normal or high voltage via the field current control means in response to the control signal duty ratio transmitted by the high-voltage load control means.

4. A failure warning system of an electric power unit as claimed in claim 2, wherein the power generation of the generator is stopped and the high-voltage circuit failure detection result is transmitted when the field current control means receives a control signal of a duty ratio different from the first and second control zones.

5. A failure warning system of an electric power unit as claimed in claim 4, wherein power generation of the generator is stopped by transmission of a control signal of a duty ratio between the first and second control zones and power generation of the generator is stopped and the high-voltage circuit failure detection result is transmitted by transmission of a control signal of a duty ratio smaller than the first control zone or larger than the second control zone.

6. A failure warning system of an electric power unit as claimed in claim 3, wherein power generation of the generator is stopped and the high-voltage circuit failure detection result is transmitted when the field current control means receives a control signal of a duty ratio different from the first and second control zones.

7. A failure warning system of an electric power unit as claimed in claim 6, wherein power generation of the generator is stopped by transmission of a control signal of a duty ratio between the first and second control zones and power generation of the generator is stopped and the high-voltage circuit failure detection result is transmitted by transmission of a control signal of a duty ratio smaller than the first control zone or larger than the second control zone.

8. A failure warning system of an electric power unit as claimed in any of claims 2 to 7, wherein the failure warning means warns the operator of an abnormal duty ratio signal and the generator is operated in a power generation mode near the normal voltage when any control signal duty ratio within the one of the ranges smaller than the first control zone and larger than the second control zone is transmitted to the field current control means by the high-voltage load controller.

* * * * *